United States Patent
Lee et al.

(10) Patent No.: US 8,703,309 B2
(45) Date of Patent: Apr. 22, 2014

(54) BATTERY PACK OF EXCELLENT PRODUCTABILITY AND STRUCTURAL STABILITY

(75) Inventors: Cheol Woong Lee, Seoul (KR); Ki eob Moon, Seoul (KR)

(73) Assignee: LG Chem, Ltd., Seoul (KR)

( * ) Notice: Subject to any disclaimer, the term of this patent is extended or adjusted under 35 U.S.C. 154(b) by 886 days.

(21) Appl. No.: 12/516,279

(22) PCT Filed: Nov. 23, 2007

(86) PCT No.: PCT/KR2007/005930
§ 371 (c)(1),
(2), (4) Date: Dec. 18, 2009

(87) PCT Pub. No.: WO2008/066287
PCT Pub. Date: Jun. 5, 2008

(65) Prior Publication Data
US 2010/0098973 A1  Apr. 22, 2010

(30) Foreign Application Priority Data
Nov. 27, 2006 (KR) ........................ 10-2006-0117312

(51) Int. Cl.
*H01M 14/00* (2006.01)
*H01M 2/00* (2006.01)
*H01M 10/50* (2006.01)

(52) U.S. Cl.
USPC ................................... 429/7; 429/61; 429/62

(58) Field of Classification Search
USPC ......... 429/7, 61, 62, 90, 92, 110, 178; 32/112
See application file for complete search history.

(56) References Cited

U.S. PATENT DOCUMENTS

| | | |
|---|---|---|
| 6,001,504 A | 12/1999 | Batson et al. |
| 6,132,900 A | 10/2000 | Yoshizawa et al. |
| 6,620,544 B1 * | 9/2003 | Shin et al. ........................ 429/56 |
| 6,936,374 B2 | 8/2005 | Ehara |
| 2004/0126651 A1 * | 7/2004 | Kim et al. ........................ 429/61 |
| 2004/0251872 A1 * | 12/2004 | Wang et al. ................... 320/112 |
| 2005/0200447 A1 * | 9/2005 | Chandler et al. ................ 338/25 |
| 2005/0208345 A1 * | 9/2005 | Yoon et al. ......................... 429/7 |
| 2006/0083982 A1 * | 4/2006 | Jung et al. ..................... 429/164 |
| 2006/0251930 A1 | 11/2006 | Kim |

(Continued)

FOREIGN PATENT DOCUMENTS

| | | |
|---|---|---|
| JP | 2002-507047 A | 3/2002 |
| JP | 2005-276575 A | 10/2005 |

(Continued)

*Primary Examiner* — John S. Maples
*Assistant Examiner* — Jimmy K Vo
(74) *Attorney, Agent, or Firm* — Birch, Stewart, Kolasch & Birch, LLP

(57) ABSTRACT

Disclosed herein is a battery pack including a battery cell, an insulative mounting member coupled to the battery cell in a specific coupling structure, a positive temperature coefficient (PTC) element having a lower connection plate directly coupled to the battery cell while the lower connection plate is not bent, and an insulative cap, whereby the number of the members for electrical connection and electrical insulation is reduced, with the result that the assembly process of the battery pack is greatly simplified, the dead space is reduced, with the result that the capacity of the battery in the same-sized battery pack is maximized, and the structural stability of the battery pack against an external force is improved.

13 Claims, 7 Drawing Sheets

(56) References Cited

U.S. PATENT DOCUMENTS

| | | |
|---|---|---|
| 2006/0251931 A1* | 11/2006 | Kim .................................. 429/7 |
| 2008/0233472 A1 | 9/2008 | Ota et al. |
| 2010/0086845 A1* | 4/2010 | Jung et al. ..................... 429/178 |

FOREIGN PATENT DOCUMENTS

| | | |
|---|---|---|
| JP | 2006-4882 A | 1/2006 |
| JP | 2006-114468 A | 4/2006 |
| JP | 2006-140149 A | 6/2006 |
| JP | 2006-236879 A | 9/2006 |
| JP | 2006-313743 A | 11/2006 |
| KR | 10-2002-0077175 A | 10/2002 |
| KR | 10-2004-0038620 A | 5/2004 |
| KR | 10-2004-0054232 A | 6/2004 |
| KR | 10-2005-0074197 A | 3/2006 |
| KR | 10-2006-0115208 A | 11/2006 |
| WO | WO 2006/123571 A1 | 11/2006 |

\* cited by examiner

BATTERY PACK OF EXCELLENT PRODUCTABILITY AND STRUCTURAL STABILITY

FIELD OF THE INVENTION

The present invention relates to a battery pack of excellent productability and structural stability, and, more particularly, to a battery pack including a battery cell, an insulative mounting member coupled to the battery cell in a specific coupling structure, a positive temperature coefficient (PTC) element having a lower connection plate directly coupled to the battery cell while the lower connection plate is not bent, and an insulative cap, whereby the number of the members for electrical connection and electrical insulation is reduced, with the result that the assembly process of the battery pack is greatly simplified, the dead space is reduced, with the result that the capacity of the battery in the same-sized battery pack is maximized, and the structural stability of the battery pack against an external force is improved.

BACKGROUND OF THE INVENTION

As mobile devices have been increasingly developed, and the demand of such mobile devices has increased, the demand of secondary batteries has also sharply increased. Among them is a lithium secondary battery having high energy density and voltage and excellent preservation and service-life characteristics, which has been widely used as an energy source for various electronic products as well as the mobile devices.

On the other hand, various kinds of combustible materials are contained in the lithium secondary battery. As a result, the lithium secondary battery may be heated or explode due to the overcharge of the battery, the overcurrent in the battery, or other physical external impacts applied to the battery. That is, the safety of the lithium secondary battery is very low. Consequently, the lithium secondary battery includes a positive temperature coefficient (PTC) element and a protection circuit module (PCM) as safety elements for effectively controlling an abnormal state of the battery, such as the overcharge of the battery, or the overcurrent in the battery. The PTC element and the PCM are connected to the battery cell.

A plurality of connection members are required to electrically connect the safety elements, including the PTC element, to the battery cell. As the connection members, nickel plates are generally used. However, it is difficult to fix the nickel plates to a battery case, which is made of aluminum, by welding. For this reason, a nickel clad member is coupled to one side of the top of the battery cell, and then the nickel plates are fixed to the nickel clad member by welding. Consequently, a plurality of members are used, and therefore, a dead space increases, with the result that the assembly process of the battery is complicated, and the capacity of the battery is reduced.

Generally, it is required for the safety elements, such as the PTC element and the PCM, to be maintained in electrical connection with electrode terminals of the battery cell and, at the same time, to be electrically isolated from other parts of the battery cell. Consequently, a plurality of insulative members are required to maintain such isolation. Generally, an adhesive is applied between the battery cell and the insulative members such that the insulative members are fixed to the battery cell by the adhesive. However, this coupling method complicates the assembly process of a battery pack and reduces the strength of the battery. When physical impacts are applied to the battery cell, the reduction of the coupling strength induces the occurrence of a short circuit in the battery cell, with the result that the battery may catch fire and explode, and therefore, the safety of the battery is lowered.

For this reason, much research has been carried out to reduce the number of the insulative mounting members, which are coupled to the battery cell, such that the assembly process of a battery pack is simplified, and, at the same time, to improve the mechanical strength of the battery cell. For example, Korean Patent Application Publication No. 2002-077175 discloses a structure in which lock protrusions are formed at a battery case or a cover, which is mounted to the top of the battery case, and lock receiving parts are formed at the cover or the battery case, such that the cover is coupled to the battery case by the engagement between the lock protrusions and the corresponding lock receiving parts. Korean Patent Registration No. 0561298 discloses a structure in which concavo-convex parts are formed at the coupling interfaces between a bare cell and a battery component section located at the top of the bare cell such that the battery component section is coupled to the bare cell by the engagement between the concavo-convex parts of the bare cell and the corresponding concavo-convex parts of the battery component section. Also, Japanese Patent Application Publication No. 2006-140149 discloses a structure in which a protecting cover is coupled to a cell by the engagement between a conductive press member, mounted to the terminal part of the cell and a conductive insertion member, which is inserted into the conductive press member.

However, the above-described technologies do not suggest a battery pack structure that is capable of providing a desired effect.

Consequently, there is a high necessity for a battery pack structure that is capable of reducing the number of members mounted to the top of the battery cell to simplify the assembly process, providing a desired weldability, and exhibiting an excellent structural stability against an external force.

SUMMARY OF THE INVENTION

Therefore, the present invention has been made to solve the above-mentioned problems, and other technical problems that have yet to be resolved.

Specifically, it is an object of the present invention to provide a battery pack wherein a positive temperature coefficient (PTC) element mounted on the top of a battery cell is formed in a specific structure to greatly simplify the assembly process of the battery pack, to minimize the volume of a member mounted on the top of the battery cell, and, at the same time, to secure an excellent weldability.

It is another object of the present invention to provide a battery pack wherein the coupling between a battery cell and an insulative mounting member, which is mounted on the top of the battery cell, is carried out by a specific coupling structure to simplify the assembly process of the battery pack and for the battery pack to exhibit an excellent structural stability against an external force.

In accordance with the present invention, the above and other objects can be accomplished by the provision of a battery pack including a battery cell having an electrode assembly of a cathode/separator/anode structure mounted in a battery case made of a metal material together with an electrolyte in a sealed state, an insulative mounting member having openings, through which electrode terminals of the battery cell are exposed to the outside, the insulative mounting member being constructed in a structure in which a protection circuit module (PCM) is mounted to the top of the insulative mounting member, the insulative mounting member being in direct contact with the top of the battery cell, a positive temperature coefficient (PTC) element electrically connected to the electrode terminals of the battery cell and the PCM, and an insulative cap coupled to the top of the battery cell such that the insulative cap surrounds the insulative mounting member while the PCM is mounted to the insulative mounting member, wherein the PTC element is constructed in a structure in which a connection plate (a) for electrical connection with the battery cell and a connection plate (b) for electrical connection with the PCM are coupled to opposite major surfaces of a PTC body, the connection plate (a) being constructed in the shape of a plate, the connection plate (a) being directly coupled to the top of the battery case by welding, while the connection plate (a) is not bent, such that the connection plate (a) is electrically connected to the top of the battery case, and wherein the battery case is provided at the top thereof with at least one coupling groove, and the insulative mounting member is provided at the bottom thereof with at least one coupling protrusion corresponding to the at least one coupling groove, whereby the coupling of the insulative mounting member to the battery cell is accomplished by the insertion of the at least one coupling protrusion into the at least one coupling groove.

In the battery pack according to the present invention, therefore, the connection plate (a) of the PTC element is coupled to the battery case by welding, while the connection plate (a) is not bent, without using an additional connection member, such that the connection plate (a) is electrically connected to the battery case. Consequently, the number of components necessary to mount the PTC element and the number of processes are greatly reduced. In addition, the PTC element is in direct contact with the battery cell. Consequently, it is possible for the PTC element to operate more reliably depending upon the temperature of the battery cell.

Also, the battery pack according to the present invention is constructed in a structure in which the at least one coupling protrusion, formed at the bottom of the insulative mounting member, is inserted into the corresponding coupling groove, formed at the top of the battery case, whereby the coupling of the insulative mounting member to the battery case is accomplished. Consequently, the coupling between the insulative mounting member and the battery case in position is secured. In addition, a high coupling force is provided in spite of a simple assembly process.

As a result, the number of the members (components) for electrical connection and electrical insulation is reduced, with the result that the assembly process of the battery pack is greatly simplified, the dead space is reduced, with the result that the capacity of the battery in the same-sized battery pack is maximized, and the structural stability of the battery pack against an external force is improved.

The electrode assembly is not particularly restricted so long as the electrode assembly can be charged and discharged. For example, the electrode assembly may be constructed in a winding (jelly-roll) type structure, a stacking type structure, or a stacking/folding type structure.

It is required for the battery case, made of a metal material, to exhibit a high processability and a mechanical strength of more than a specific level. Consequently, the battery case may be made of aluminum. Preferably, the battery case is a prismatic container made of aluminum.

The mounting member is constructed in a structure in which the PCM is coupled to the top of the mounting member. The mounting member is made of an insulative material, and the mounting member is in direct contact with the top of the battery cell. In a preferred embodiment, the insulative mounting member has a size approximately corresponding to that of the top of the battery cell, the insulative mounting member is provided at the middle thereof with a first opening, through which the first electrode terminal of the battery cell is exposed to the outside, and the insulative mounting member is provided at a position spaced a predetermined distance from the first opening with a second opening, through which a portion of the top of the battery case of the battery cell (the second electrode terminal) is exposed to the outside.

Also, the insulative mounting member may be constructed in a structure in which opposite-side ends of the insulative mounting member protrude upward by a predetermined height to secure an installation space of the PCM.

The coupling between the at least one coupling groove, formed at the top of the battery cell, and the at least one coupling protrusion, formed at the bottom of the mounting member, is accomplished in the longitudinal direction of the battery cell, with the result that the coupling between the at least one coupling groove and the corresponding coupling protrusion may be weaker due to the longitudinal tensile force rather than vertical impacts applied to the battery cell. Consequently, the at least one coupling protrusion may be inserted into the corresponding coupling groove, after an adhesive agent is injected into the coupling groove, to solve the above-mentioned problem.

According to circumstances, an adhesive agent may be further applied to the at least one coupling groove and the at least one coupling protrusion in order to complement the coupling force of the coupling member. Especially, it is preferable to insert the at least one coupling protrusion into the at least one coupling groove after the adhesive agent is injected into the at least one coupling groove.

The PTC element is a kind of safety element that interrupts current through the increase of resistance when the temperature of the battery cell increases, and conducts current through the decrease of resistance when the temperature of the battery cell decreases. The PTC element is located on a connection circuit between the battery cell and the PCM for performing the current interruption and the current conduction depending upon the temperature of the battery cell. Generally, the PTC element includes a PTC body constructed in a structure in which metal foils are joined to the upper and lower surfaces of a PTC material layer made of a polymer composite the resistance of which changes depending upon temperature and variable connection leads, such as nickel plates, coupled to the top and bottom of the PTC body by soldering. Consequently, the upper nickel plate is connected to the PCM by soldering, and the lower nickel plate is coupled to the top of the battery case, to which the nickel clad member is coupled, whereby the electrical connection therebetween is accomplished. Also, a nickel plate of a predetermined length is used to couple the PTC element to the battery case by welding, during the assembly process of the battery pack, and the assembly of the battery pack is carried out while the nickel plate is bent.

According to the present invention, on the other hand, the connection plate (a) of the PTC element, which is used for the electrical connection with the battery cell, is directly coupled to the top of the battery case by welding while the connection plate (a) is not bent, whereby the assembly process is greatly simplified. Also, a space necessary to bend the variable connection lead is not required at least during the electrical connection of the PTC element to the battery cell.

As previously described, a nickel plate of a predetermined length is coupled to the PTC element, the battery cell, and the PCM by soldering or welding, and is then bent, in order to accomplish the electrical connection between the PTC element, the battery cell, and the PCM according to the conventional art. However, the bent portion of the nickel plate may be brought into contact with the electrode terminal due to external impacts, with the result that a short circuit may occur, and the PTC element may not normally operate. According to the present invention, however, the electrical connection between the PTC element and the battery cell is accomplished by the connection plate (a), which is not bent, and the stable fixing of the PTC element is secured by the insulative mounting member, whereby a possibility of the PTC element contacting with the electrode terminal is prevented. Consequently, the occurrence of a short circuit due to the current conduction between the PTC element and the electrode terminal is prevented, and the decrease of the operation reliability of the PTC element is prevented.

Various kinds of connection plates (a) may be used, and the connection plate (a) may be coupled to the battery case by welding in various manners. However, resistance welding or laser welding is preferred to ultrasonic welding, which exerts an influence on other regions (for example, the welded region between the container and the top cap).

In a preferred embodiment, the connection plate (a) is a metal plate, which is coupled to the battery case by laser welding. The metal plate is not bent, and the metal plate may contain nickel as a main ingredient.

In another preferred embodiment, the connection plate (a) is constructed in a clad metal structure in which the part facing the battery cell contains the same material as the battery case as a main ingredient, the connection plate being coupled to the battery case by resistance welding. The connection plate of the clad metal structure is not bent, and the connection plate may be a nickel clad member containing aluminum as a main ingredient at the part facing the battery case.

Consequently, the connection plate (a) of the PTC element is directly coupled to a predetermined position of the top of the battery case by welding, and the connection plate (b) is connected to the PCM, whereby the PTC element is located on the connection circuit between the battery cell and the PCM. Preferably, the connection plate (a) has a size greater than that of the PTC body and the connection plate (b) such that the connection plate (a) is easily coupled to the top of the battery case by welding, and the connection plate (a) is at least partially exposed upward.

The connection plate (b) may not be bent during the assembly process of the battery pack, like the connection plate (a). Alternatively, the connection plate (b) may be bent during the assembly process of the battery pack. Consequently, the connection plate (b) may be a nonvariable nickel plate or a variable nickel plate, and the connection plate (b) may be coupled to the PCM by soldering. Preferably, the nonvariable nickel plate is coupled to a predetermined region of the PCM by a surface mounting technology (SMT), which is a kind of soldering. In this case, the PTC element is placed on the PCM such that the connection plate (b) is coupled to the PCM by the SMT, and a welding process is carried out such that the connection plate (a) of the PTC element is coupled to the top of the battery case, whereby the PTC element is located on the connection circuit between the battery cell and the PCM while the connection plate (a) and the connection plate (b) are not bent.

In a preferred embodiment, the battery cell is provided at the middle of the top thereof with a protruding terminal, which is insulated from the battery case, and the PTC element is coupled to the top of the battery case, at a position spaced apart from the protruding terminal, by welding, and the protruding terminal and the PCM are electrically connected to each other by a predetermined connection member.

The connecting member is not particularly restricted so long as the connecting member is made of a variable conductive material. Preferably, the connecting member is a nickel plate.

The insulative cap serves to protect the battery cell against external impacts, to complement the mechanical strength of the members mounted to the top of the battery cell, and to maintain the electrical insulation. To this end, the insulative cap may extend downward by a predetermined length sufficient for at least some of the insulative cap to surround the outside of the top of the battery cell while the insulative cap is mounted on the battery cell.

In order to increase the coupling force between the insulative cap and the battery cell, the downward extending portion of the insulative cap is preferably fixed to the outside of the top of the battery cell by a bonding fashion or a mechanical coupling fashion.

The battery pack may further include another insulative cap (bottom cap) coupled to the bottom of the battery cell in addition to the insulative cap coupled to the top of the battery cell. Furthermore, the battery pack may further include a sheathing film attached to the outer surface of the battery case of the battery cell. Consequently, it is possible to protect the battery cell against external impacts and to maintain the electrical insulation. Preferably, the sheathing film is attached to the outer surface of the battery case of the battery cell such that the sheathing film surrounds the downward extending portion of the insulative cap.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
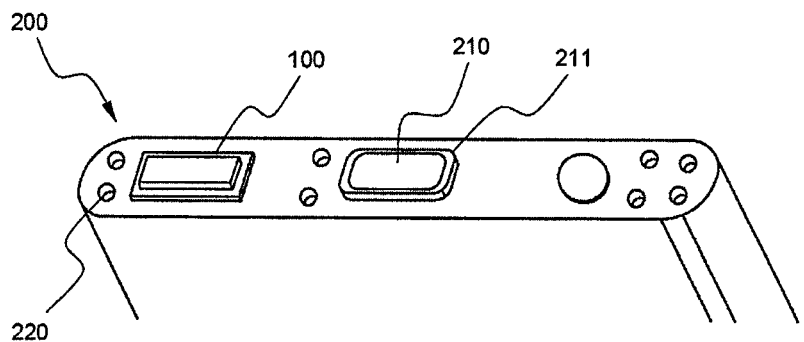
FIG. 1 is a partial perspective view illustrating the top of a battery cell according to a preferred embodiment of the present invention.

FIG. 1 is a partial perspective view illustrating the top of a battery cell according to a preferred embodiment of the present invention.

Referring to FIG. 1, the battery cell 200 is constructed in a structure in which an electrode assembly (not shown) of a cathode/separator/anode structure is mounted in a battery case (metal container) together with an electrolyte in a sealed state. An anode terminal 210 protrudes from the middle of the top of the battery cell 200. The metal container itself constitutes a cathode. The anode terminal 210 is electrically insulated from the metal container by an insulative member 211. At opposite sides of the top of the battery cell 200 are formed a plurality of coupling grooves 220, into which coupling protrusions 330 (see FIG. 2) of an insulative mounted member are engaged. Also, a positive temperature coefficient (PTC) element 100 is coupled to the top of the battery cell 200 at one side of the anode terminal 210. The PTC element 100 includes a connection plate (a) of a clad metal structure (a lower connection plate), a PTC body, and a connection plate (b) (an upper connection plate). For simple illustration, the upper connection member is omitted from the drawing. The structure of the PTC element 100 will be described below in more detail.

Figure 2:
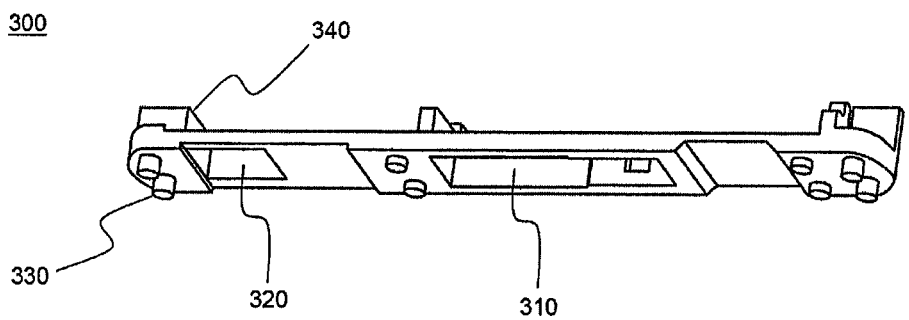
FIG. 2 is a perspective view illustrating an insulative mounting member, which will be coupled to the top of the battery cell according to the present invention.

FIG. 2 is a perspective view illustrating an insulative mounting member, which will be coupled to the top of the battery cell shown in FIG. 1.

Referring to FIG. 2, the insulative mounting member 300 has a size approximately corresponding to that of the top of the battery cell 200 (see FIG. 1). The insulative mounting member 300 is provided at the middle thereof with a first opening 310, through which the anode terminal 210 (see FIG. 1) of the battery cell 200 is exposed to the outside. Also, a second opening 320, through which a portion of the top of the battery cell 200 (the cathode terminal) is exposed to the outside, is formed at the insulative mounting member 300 such that the second opening 320 is spaced a predetermined distance from the first opening 310. Specifically, the PTC element 100, coupled to the battery cell, or the upper connection plate (not shown) of the PTC element 100 is exposed to the outside through the second opening 320.

Figure 3:
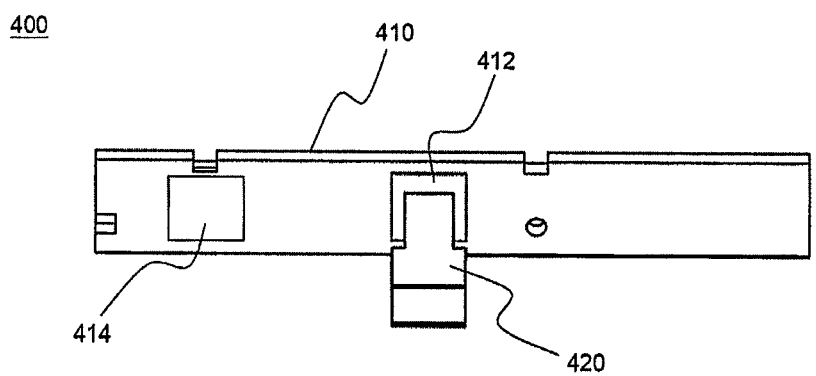
FIG. 3 is a perspective view illustrating a protection circuit module (PCM), which will be coupled to the insulative mounting member according to the present invention.

Opposite-side ends 340 of the insulative mounting member 300 protrude upward by a predetermined height to provide a space sufficient to couple a protection circuit module (PCM) 400 (see FIG. 3).

Also, the insulative mounting member 300 is provided at the bottom thereof with a plurality of coupling protrusions 330 corresponding to the coupling grooves 220 (see FIG. 1) formed at the top of the battery cell 200. The coupling protrusions 330 are engaged into the coupling grooves 220 formed at the top of the battery cell 200, whereby the mechanical coupling between the battery cell 200 and the insulative mounting member 300 is accomplished.

FIG. 3 is a perspective view illustrating a PCM, which will be coupled to the insulative mounting member according to the present invention.

Referring to FIG. 3, the PCM 400 includes a board having a protection circuit printed thereon (a protection circuit board) 410, and electrode terminal connection parts 412 and 414 formed at the bottom of the protection circuit board 410. The protection circuit board 410 is constructed in a printed circuit board (PCB) structure in which a protection circuit (not shown) for controlling the overcharge, the overdischarge, and the overcurrent of the battery is printed on a rectangular structure made of an epoxy composite. A variable nickel plate 420 is coupled to the anode terminal connection part 412, electrically connected to the protection circuit, by soldering. The nickel plate 420 is connected to the anode terminal 210 (see FIG. 1) of the battery cell. The upper connection plate of the PTC element 100 (see FIG. 1) is coupled to the cathode terminal connection part 414 by soldering.

Figure 4:
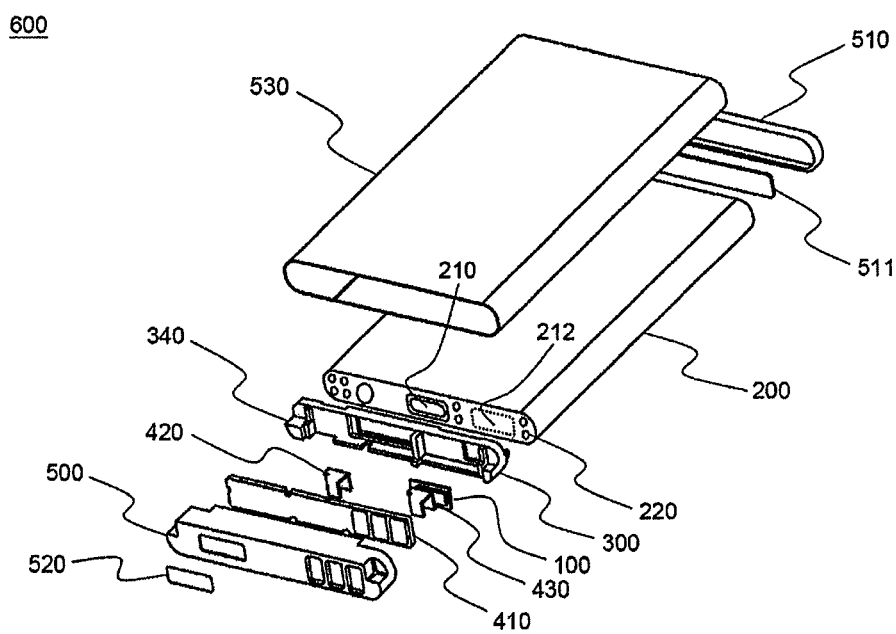
FIG. 4 is an exploded perspective view illustrating a battery pack according to a preferred embodiment of the present invention.

FIG. 4 is an exploded perspective view illustrating a battery pack according to a preferred embodiment of the present invention.

Referring to FIG. 4, the battery pack 600 according to the present invention includes a battery cell 200, an insulative mounting member 300, a PTC element 100, a protection circuit board 410, insulative top and bottom caps 500 and 510, and a sheathing film 530.

The battery cell 200 is constructed in a structure in which an electrode assembly of a cathode/separator/anode structure is mounted in a prismatic metal container together with an electrolyte in a sealed state. At the top of the battery cell 200 are formed an anode terminal 210, which is located at the middle of the battery cell 200, a cathode terminal 212, which is located at one side of the anode terminal 210 such that the PTC element 100, including the connection plate of the clad metal structure, is coupled to the cathode terminal 212 by welding, and a plurality of coupling grooves 220, which are concave such that the insulative mounting member 300 is coupled to the top of the battery cell 200.

The insulative mounting member 300 has openings, through which the anode terminal 210 and the cathode terminal 212 of the battery cell 200 are exposed to the outside. The opposite-side ends of the insulative mounting member 300 protrude upward by a predetermined height such that the protection circuit board 410 can be stably coupled to the top of the insulative mounting member 300. The insulative mounting member 300 is coupled to the top of the battery cell 200 such that the insulative mounting member 300 is brought into direct contact with the battery cell 200. Also, the insulative mounting member 300 is provided at the bottom thereof with a plurality of coupling protrusions 330 (see FIG. 2), corresponding to the coupling grooves 220 formed at the top of the battery cell 200.

The insulative top cap 500 is coupled to the top of the battery cell 200, such that the insulative top cap 500 surrounds the insulative mounting member 300, while the protection circuit board 410 is coupled to the top of the insulative mounting member 300. The insulative top cap 500 extends downward by a predetermined length sufficient to surround the outside of the top of the battery cell 200. To one side of the top of the insulative top cap 500 is attached a warranty label 520.

Also, the bottom cap 410 is fixed to the bottom of the battery cell 200 by an adhesive bottom cap tape 511. The outer circumference of the battery cell 200 is surrounded by the insulative sheathing film 530.

Hereinafter, a process for assembling the battery pack according to a preferred embodiment of the present invention will be described in detail with reference to FIGS. 5 to 8, which are partial front views illustrating the battery pack assembly process.

Figure 5:
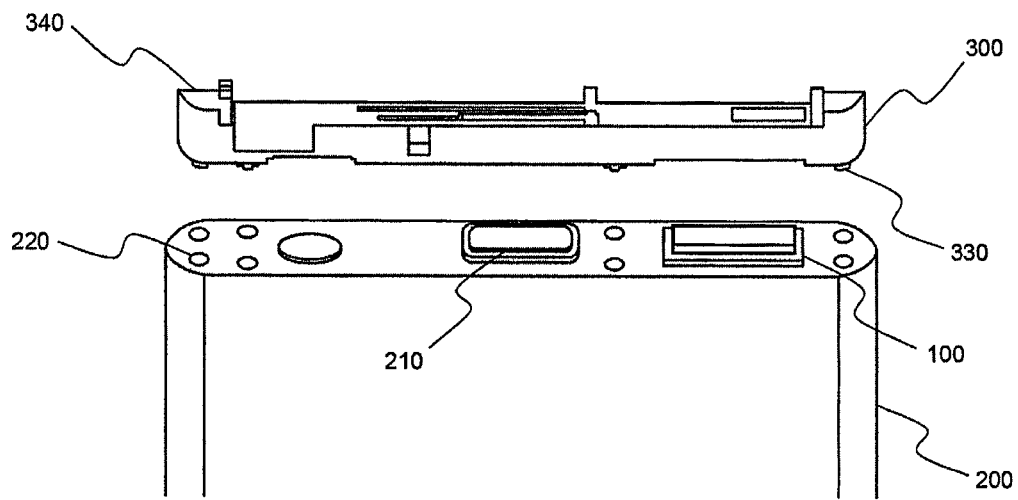
FIGS. 5 to 8 are partial front views illustrating a process for assembling the battery pack according to a preferred embodiment of the present invention.

Referring first to FIG. 5, the PTC element 100, the lower connection plate of which is constructed in a clad metal structure or is made of a nickel plate, is coupled to the top of the battery cell 200 at one side of the battery cell 200 spaced apart from the anode terminal 210 by welding. The battery cell 200 is provided at the top thereof with a plurality of coupling grooves 220, and the insulative mounting member 300 is provided at the bottom thereof with a plurality of coupling protrusions 330 corresponding to the coupling grooves 220. Consequently, the coupling of the insulative mounting member 300 to the battery cell 200 is accomplished by the insertion of the coupling protrusions 330 into the corresponding coupling grooves 220. In order to provide a higher coupling force, the coupling protrusions 330 may be inserted into the corresponding coupling grooves 220 after an adhesive agent is injected in the coupling grooves 220.

Figure 6:
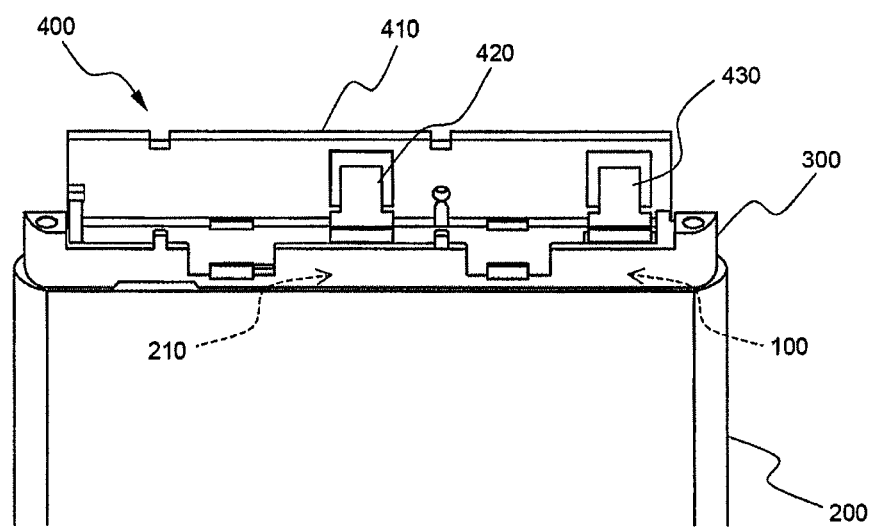
Figure 7:
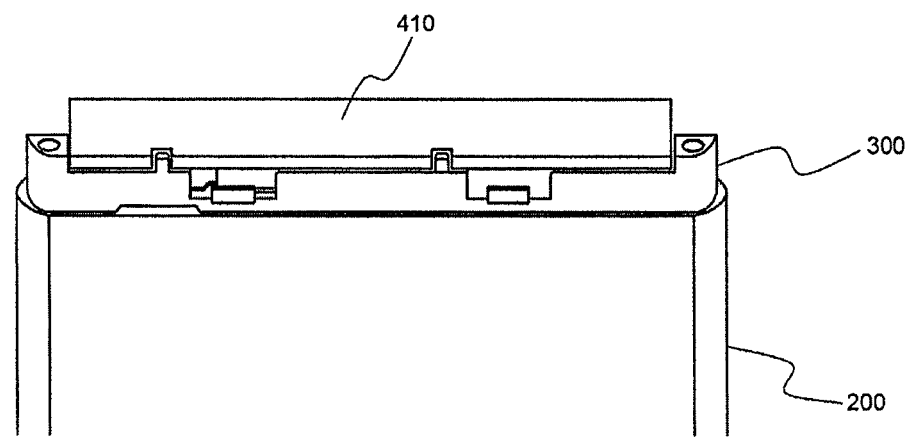

Subsequently, as shown in FIGS. 6 and 7, the PCM 400, including the protection circuit board 410, is placed on the insulative mounting member 300. To the protection circuit board 410, a nickel plate 420, which is connected to the anode terminal 210 of the battery cell 200, and a nickel plate 430, serving as the upper connection plate of the PTC element 100, are coupled. Consequently, an anode of the protection circuit board 410 is connected to the anode terminal 210 of the battery cell 200, and a cathode of the protection circuit board 410 is connected to the PTC element 100, fixed to the anode terminal of the battery cell 200, using the nickel plates 420 and 430, while the protection circuit board 410 is located such that the protection circuit board 410 is perpendicular to the top of the battery cell 200.

The nickel plate 430 serves as the upper connection plate of the PTC element 100. Consequently, the PTC element 100, to which the nickel plate 430 is coupled by soldering, may be coupled to the top of the battery cell at the step of FIG. 5. In this case, a process for connecting the nickel plate 430 to the protection circuit board 410 is carried out at the step of FIG. 6.

Subsequently, the nickel plates 420 and 430 are bent, such that the protection circuit board 410 can be placed on the insulative mounting member 300 in parallel with the top of the battery cell 200. As a result, the nickel plates 420 and 430 are brought into tight contact with the insulative mounting member 300. The coupling positions of the nickel plates 420 and 430 and the bent shapes of the nickel plates 420 and 430 are shown in FIG. 3.

Figure 8:
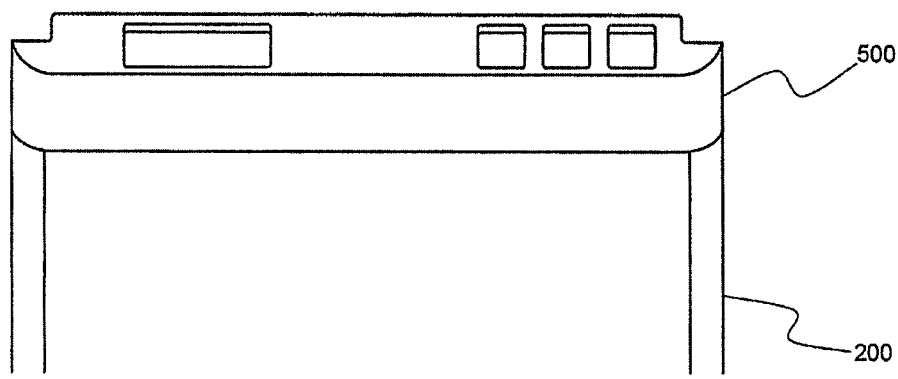

Referring to FIG. 8, the insulative cap 500 is coupled to the top of the battery cell 200 such that the insulative cap 500 surrounds the insulative mounting member 300 while the protection circuit module (not shown) is placed on the insulative mounting member 300. The downward extending portion of the insulative cap 500 surrounds the outside of the top of the battery cell 200. Consequently, the mechanical coupling between the insulative cap 500 and the battery cell 200 is accomplished.

Figure 9:
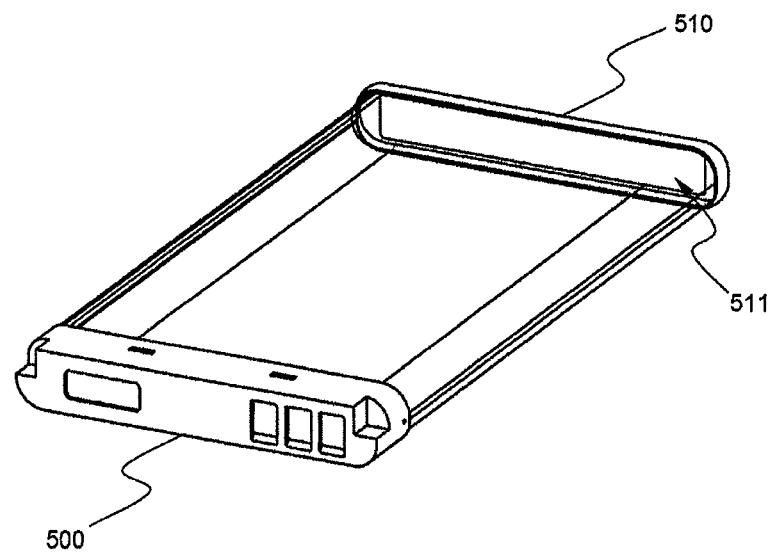
FIG. 9 is a typical view illustrating a battery pack according to a preferred embodiment of the present invention.

FIG. 9 is a perspective view typically illustrating a battery pack according to a preferred embodiment of the present invention constructed in a structure in which a top cap and a bottom cap are coupled to a battery cell.

Referring to FIG. 9, another insulative cap (bottom cap) 510 is coupled to the bottom of the battery cell 200 in addition to the insulative cap 500 coupled to the top of the battery cell 200. Specifically, a double-sided adhesive bottom cap tape 511 is attached to the bottom of the battery cell 200, and the insulative bottom cap 510 is fixed to the bottom of the battery cell 200 by the bottom cap tape 511.

Figure 10:
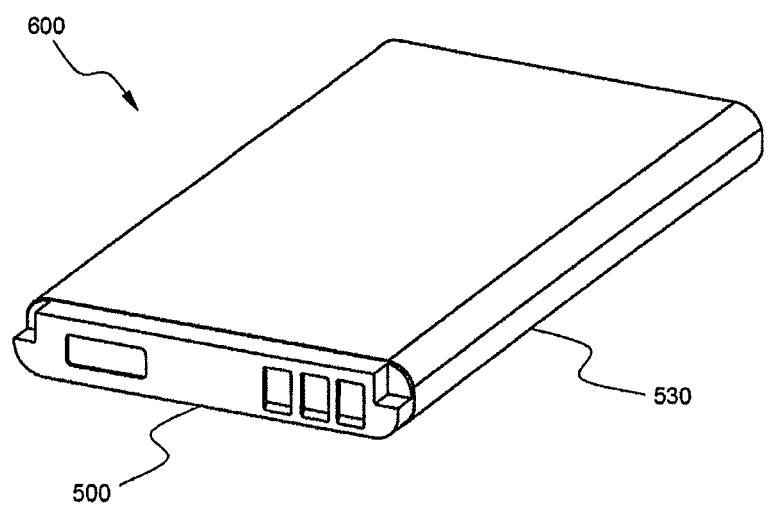
FIG. 10 is a perspective view illustrating a battery pack completed according to a preferred embodiment of the present invention.

FIG. 10 is a perspective view illustrating a battery pack completely assembled according to a preferred embodiment of the present invention.

Referring to FIG. 10, the battery pack 600 is constructed in a structure in which the remaining parts of the battery pack 600, excluding an external input and output terminal part, are electrically insulated from the outside by the insulative top cap 500, the sheathing film 530, and the bottom cap (not shown), while the protection circuit module (PCM) and the insulative mounting member are coupled to the top of the battery cell.

Figure 11:
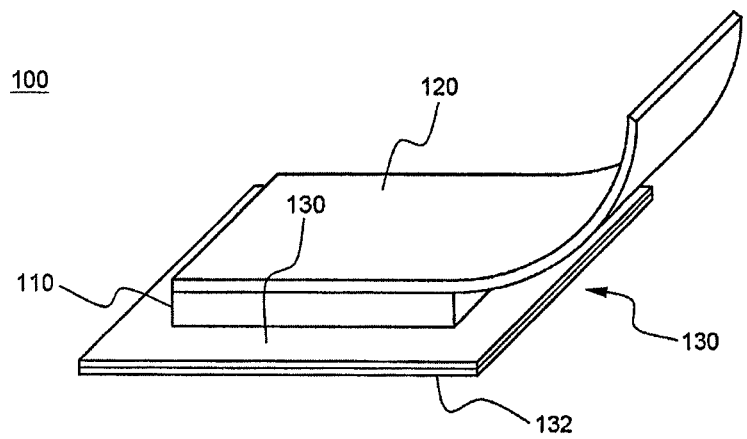
FIG. 11 is a perspective view illustrating an example of a positive temperature coefficient (PTC) element, which is used in the battery pack according to the present invention.

FIG. 11 is a perspective view illustrating an example of a PTC element, which is used in the battery pack according to the present invention.

Referring to FIG. 11, the PTC element 100 is constructed in a structure in which a lower connection plate 130, a PTC body 110, and an upper connection plate 120 are sequentially stacked.

The lower connection plate 130 has a size greater than that of the PTC body 110 and the upper connection plate 120. For this reason, the lower connection plate 130 is easily coupled to the battery cell by welding from above while the lower connection plate 130 is located at the top of the battery cell. Consequently, the lower connection plate 130 is coupled to the top of the battery cell (specifically, the metal container as the battery case) while the lower connection plate 130 is not bent.

On the other hand, the upper connection plate 130 is made of a variable member. The upper connection plate 130 is bent during the assembly process of the battery pack. The upper connection plate 130 was described as the nickel plate 430 in connection with FIGS. 3 to 6.

The lower connection plate 130 may be made of a single material. In this case, the lower connection plate 130 is coupled to the battery cell by laser welding. Alternatively, as shown in FIG. 11, the lower connection plate 130 may be constructed in a clad metal structure in which the upper part of the lower connection plate 130 contains nickel as a main ingredient, and the lower part 132 of the lower connection plate 130 contains aluminum as a main ingredient. In this case, the lower connection plate 130 is coupled to the battery cell by resistance welding.

Figure 12:
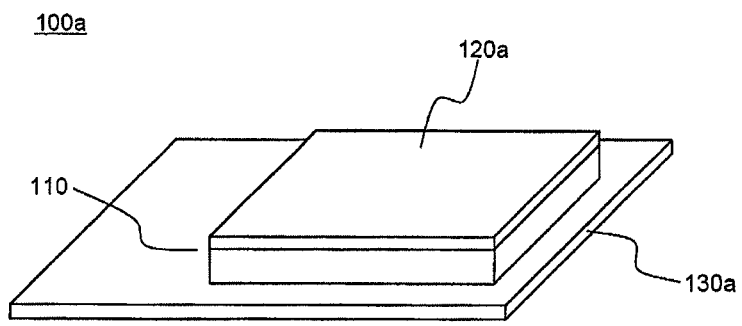
FIG. 12 is a perspective view illustrating another example of a PTC element, which is used in the battery pack according to the present invention.

FIG. 12 is a perspective view illustrating another example of a PTC element, which is used in the battery pack according to the present invention.

Referring to FIG. 12, the PTC element 100a of this example is identical to the PTC element 100 of FIG. 11 in that a lower connection plate 130a, a PTC body 110, and an upper connection plate 120a are sequentially stacked. However, the PTC element 100a of FIG. 12 is different from the PTC element 100 of FIG. 11 in that the lower connection plate 130a is made of a nickel plate, and the upper connection plate 120a is connected to the PCM (not shown) while the upper connection plate 120a is not bent like the lower connection plate 130a.

The lower connection plate 130a is coupled to the top of the battery case (not shown) by laser welding. However, the lower connection plate 130a may be constructed in the clad metal structure, and may be coupled to the top of the battery case by resistance welding, as shown in FIG. 11.

The upper connection plate 120a is made of a nonvariable nickel plate. The upper connection plate 120a is coupled to the electrode terminal connection part 412 of the PCM by a surface mount technology (SMT).

Figure 13:
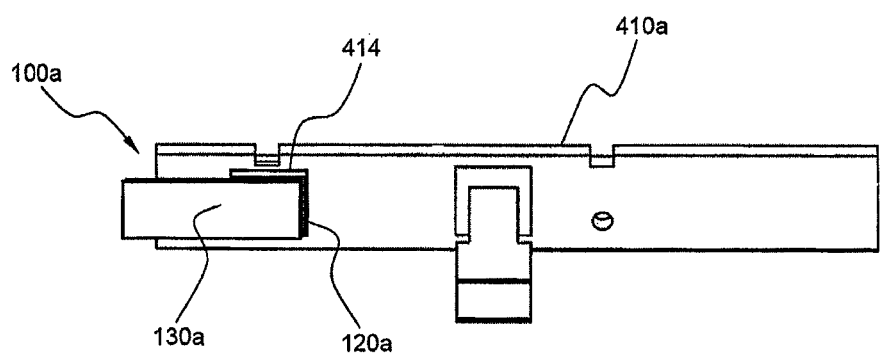
FIG. 13 is a typical view illustrating the PTC element of FIG. 12 coupled to a protection circuit board.
Figure 14:
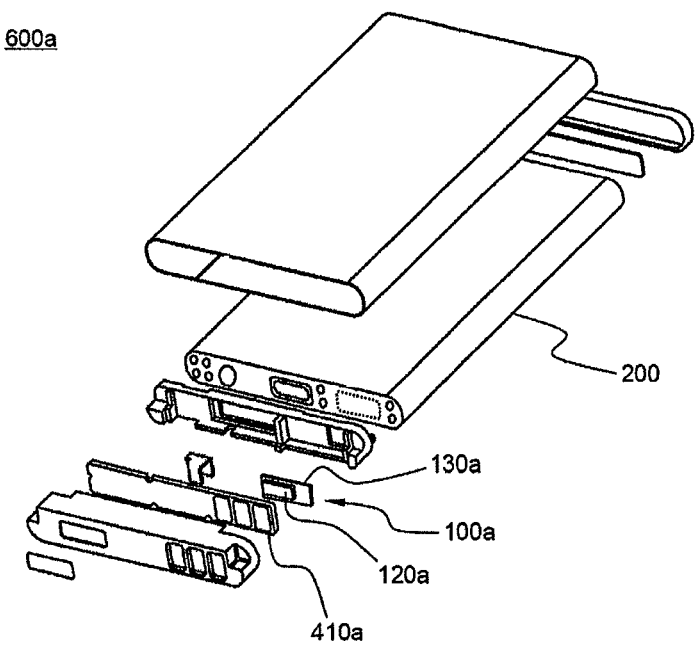
FIG. 14 is an exploded perspective view illustrating a battery pack, according to another preferred embodiment of the present invention, including the protection circuit board of FIG. 13.

FIG. 13 is a typical view illustrating the PTC element of FIG. 12 coupled to a protection circuit board, and FIG. 14 is an exploded perspective view illustrating a battery pack, according to another preferred embodiment of the present invention, including the protection circuit board.

Referring to these drawings, the upper connection plate 120a of the PTC element 100a is coupled to the protection circuit board 410a by a SMT, while the upper connection plate 120a is not bent. Consequently, during the assembly process of the battery pack 600a, the PTC element 100a is placed on the protection circuit board 410a, such that the upper connection plate 120a is coupled to the electrode terminal connection part 414 of the protection circuit board 410a by the SMT, and a resistance welding process is carried out such that the lower connection plate 130s of the PTC element 100a is coupled to the top of the metal container.

The lower connection plate 130a of the PTC element 100a has a size greater than that of the PTC body and the upper connection plate 120a such that the PTC element 100a is easily coupled to the top of the metal container of the battery cell 200 by welding, while the PTC element 100a is placed on the protection circuit board 410a. Also, the lower connection plate 130a has a size sufficient to be exposed from one end of the protection circuit board 410a when viewed from above.

The shape, size, and structure of the PTC element may be changed variously based on the above description within the scope of the present invention.

Industrial Applicability

As apparent from the above description, the battery pack according to the present invention has the following effects. According to the present invention, the number of the members for electrical connection and electrical insulation is reduced, and therefore, the assembly process of the battery pack is greatly simplified. Also, the dead space is reduced, and therefore, the capacity of the battery in the same-sized battery pack is maximized. In addition, the structural stability of the battery pack against an external force is improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A battery pack comprising:
a battery cell having an electrode assembly of a cathode/separator/anode structure mounted in a battery case made of a metal material together with an electrolyte in a sealed state;
an insulative mounting member having openings, through which electrode terminals of the battery cell are exposed to an outside, the insulative mounting member being constructed in a structure in which a protection circuit module (PCM) is mounted to a top of the insulative mounting member, the insulative mounting member being in direct contact with a top of the battery cell;
a positive temperature coefficient (PTC) element electrically connected to the electrode terminals of the battery cell and the PCM; and
an insulative cap coupled to the top of the battery cell such that the insulative cap surrounds the insulative mounting member while the PCM is mounted to the insulative mounting member,
wherein the PTC element is constructed in a structure in which a first connection plate for electrical connection with the battery cell and a second connection plate for electrical connection with the PCM are coupled to opposite major surfaces of a PTC body, the first connection plate being constructed in the shape of a plate, the first connection plate being directly coupled to a top of the battery case by welding, while the first connection plate is not bent, such that the first connection plate is electrically connected to the top of the battery case,
wherein the first connection plate is constructed in a clad metal structure in which a part facing the battery cell is made of the same material as the battery case, the first connection plate being coupled to the battery case by resistance welding,
wherein the first connection plate has a size greater than that of the PTC body and the second connection plate such that the first connection plate is coupled to the top of the battery case by welding, and a portion of the first connection plate extends beyond a perimeter of a protection circuit board of the PCM when viewed from above,
wherein the second connection plate is a nonvariable nickel plate, which is coupled to the PCM by a surface mounting technology, and
wherein the battery cell is provided at the top thereof with at least one coupling groove, and the insulative mounting member is provided at a bottom thereof with at least one coupling protrusion corresponding to the at least one coupling groove, whereby coupling of the insulative mounting member to the battery cell is accomplished by insertion of the at least one coupling protrusion into the at least one coupling groove.

2. The battery pack according to claim 1, wherein the battery case is a prismatic container made of aluminum.

3. The battery pack according to claim 1, wherein the insulative mounting member has a size corresponding to that of the top of the battery cell, the insulative mounting member is provided at a middle thereof with a first opening, through which a first electrode terminal of the battery cell is exposed to the outside, and the insulative mounting member is provided at a position spaced a predetermined distance from the first opening with a second opening, through which a portion of the top of the battery case of the battery cell is exposed to the outside, the portion of the top of the battery case defining a second electrode terminal.

4. The battery pack according to claim 1, wherein the insulative mounting member is constructed in a structure in which opposite-side ends of the insulative mounting member protrude upward by a predetermined height to secure an installation space of the PCM.

5. The battery pack according to claim 1, wherein the at least one coupling protrusion is inserted into the at least one coupling groove after an adhesive agent is applied to the at least one coupling protrusion or the at least one coupling groove.

6. The battery pack according to claim 1, wherein the first connection plate is a metal plate, which is coupled to the battery cell by laser welding.

7. The battery pack according to claim 6, wherein the metal plate is not bent, and the metal plate is made of nickel as a main ingredient.

8. The battery pack according to claim 1, wherein the connection plate of the clad metal structure is not bent, and the connection plate is a nickel clad member made of aluminum at the part facing the battery cell.

9. The battery pack according to claim 1, wherein the battery cell is provided at a middle of the top thereof with a protruding terminal, which is insulated from the battery cell, and the PTC element is coupled to the top of the battery case, at a position spaced apart from the protruding terminal, by welding, and the protruding terminal and the PCM are electrically connected to each other by a predetermined connection member.

10. The battery pack according to claim 1, wherein the insulative cap extends downward by a predetermined length sufficient for at least some of the insulative cap to surround an outside of the top of the battery cell while the insulative cap is mounted on the battery cell.

11. The battery pack according to claim 10, wherein the downward extending portion of the insulative cap is fixed to the outside of the top of the battery cell by a bonding fashion or a mechanical coupling fashion, thereby increasing a coupling force between the insulative cap and the battery cell.

12. The battery pack according to claim 1, further comprising:
   an insulative bottom cap coupled to a bottom of the battery cell.

13. The battery pack according to claim 10, wherein a sheathing film is attached to an outer surface of the battery cell such that the sheathing film surrounds the downward extending portion of the insulative cap.

* * * * *